United States Patent
Wackerly et al.

(10) Patent No.: US 11,546,235 B2
(45) Date of Patent: Jan. 3, 2023

(54) ACTION BASED ON ADVERTISEMENT INDICATOR IN NETWORK PACKET

(71) Applicant: Hewlett Packard Enterprise Development LP, Houston, TX (US)

(72) Inventors: Shaun Wackerly, Lincoln, KY (US); Shaun Wakumoto, Roseville, CA (US); Bruce E LaVigne, Roseville, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 423 days.

(21) Appl. No.: 16/061,431

(22) PCT Filed: Mar. 8, 2016

(86) PCT No.: PCT/US2016/021314
§ 371 (c)(1),
(2) Date: Jun. 12, 2018

(87) PCT Pub. No.: WO2017/155514
PCT Pub. Date: Sep. 14, 2017

(65) Prior Publication Data
US 2020/0267064 A1      Aug. 20, 2020

(51) Int. Cl.
*H04L 43/028* (2022.01)
*G06Q 30/02* (2012.01)
(Continued)

(52) U.S. Cl.
CPC ....... *H04L 43/028* (2013.01); *G06Q 30/0254* (2013.01); *H04L 43/026* (2013.01); *H04L 61/4511* (2022.05); *H04L 67/34* (2013.01)

(58) Field of Classification Search
CPC . H04L 43/028; H04L 43/026; H04L 61/1511; H04L 67/34; G06Q 30/0254
See application file for complete search history.

(56) References Cited

U.S. PATENT DOCUMENTS 8,239,263 B2     8/2012  Axe et al.
8,745,753 B1     6/2014  Gottlieb et al.
(Continued)

FOREIGN PATENT DOCUMENTS

CN         103327104 A        9/2013
WO      WO-2012152813        11/2012

OTHER PUBLICATIONS

"Cisco ASR 5000 Series Traffic Performance Optimization Administration Guide," Apr. 30, 2011, pp. 1-54, Version 12.0, Cisco Systems, Inc.
(Continued)

*Primary Examiner* — Kevin S Mai
(74) *Attorney, Agent, or Firm* — Hewlett Packard Enterprise Patent Department (57) ABSTRACT

Examples disclosed herein relate to performing an action based on an advertisement indicator is present in a network packet. In one example, a network packet identified by a network infrastructure device as matching criteria associated with a pre-identified request is received. A parameter within the network packet is identified. A rule is used to determine whether the parameter indicates that an advertisement indicator is present in a flow associated with the network packet. An action is performed based on whether the advertisement indicator is present in the network packet.

20 Claims, 3 Drawing Sheets

(51) Int. Cl.
*H04L 43/026* (2022.01)
*H04L 67/00* (2022.01)
*H04L 61/4511* (2022.01)

(56) References Cited

U.S. PATENT DOCUMENTS

| | | | |
|---|---|---|---|
| 8,996,711 B2 | 3/2015 | van Riel | |
| 2008/0133518 A1 | 6/2008 | Kapoor et al. | |
| 2012/0084423 A1* | 4/2012 | McGleenon | H04L 61/1511 709/223 |
| 2012/0221386 A1 | 8/2012 | Netzer et al. | |
| 2013/0044599 A1* | 2/2013 | Cherian | H04L 47/2433 370/235 |
| 2015/0170072 A1 | 6/2015 | Grant et al. | |
| 2015/0172300 A1 | 6/2015 | Cochenour | |
| 2017/0237823 A1* | 8/2017 | Pyper | H04L 51/066 709/201 |

OTHER PUBLICATIONS

International Searching Authority, The International Search Report and the Written Opinion, dated Dec. 1, 2016, PCT/US2016/021314, 14 Pgs.

Pi-hole, "Pi-Hole Network-wide Ad Blocking," retrieved online Oct. 30, 2019, https://pi-hole.net/.

Pi-hole, "Pi-hole Origins," retrieved online Oct. 30, 2019, https: //docs.pi-hole.net/main/origins/.

Salmela, J., "Block Millions of Ads Network-wide with a Raspberry Pi-hole 2.0," retrieved online Oct. 30, 2019, https://jacobsalmela.com/2015/06/16/block-millions-ads-network-wide-with-a-raspberry-pi-hole-2-0/.

White, Russ, "What is Service Chaining?", PacketPushers, Aug. 9, 2014, 11 pages.

Sun, Leo, "Apple Inc. Unleashes Ad-Blocking Hell on Google Inc.", The Motley Fool, Sep. 21, 2015, 26 pages.

International Preliminary Report on Patentability received for PCT Patent Application No. PCT/US2016/021314, dated Sep. 20, 2018, 10 pages.

Hewlett Packard Enterprise Development LP, "HPE Network Protector 1.3.105 SDN Application Administrator Guide", Chapter 1: HPE Network Protector Solution Overview, Part No. 5200-1269, Jul. 2016, 11 pages.

Fielding et al., "Hypertext Transfer Protocol—HTTP/1.1", Network Working Group, Request for Comments: 2616, Chapter 5—Request, 12 pages.

Aisch et al., "The Cost of Mobile Ads on 50 News Websites", The New York Times, Oct. 1, 2015, 10 pages.

"EasyList", Adblock Plus 2.0, Version 201812040920, Mar. 5, 2016, 1109 pages.

* cited by examiner

*FIG. 5*

ACTION BASED ON ADVERTISEMENT INDICATOR IN NETWORK PACKET

BACKGROUND

Computing networks can include multiple network devices such as routers, switches, hubs, servers, desktop computers, laptops, workstations, network printers, network scanners, etc. that are networked together across a local area network (LAN), wide area network (WAN), wireless networks, etc. Networks can include deep packet inspection devices, firewalls, etc. to detect unwanted activity acting on the computer network. Further, networks can be managed using a Software Defined Networking controller.

BRIEF DESCRIPTION OF THE DRAWINGS

The following detailed description references the drawings, wherein.

DETAILED DESCRIPTION

Computing networks can include multiple network devices such as routers, switches, hubs, servers, desktop computers, laptops, workstations, network printers, network scanners, etc. that are networked together across a local area network (LAN), wide area network (WAN), wireless networks, etc.

Various entities add advertisements to websites to earn money. These advertisements may include malware or may be benign. In some examples, advertisements may consume processing power, energy, etc. from end user devices. For example, some advertisements include video or other rich content that consumes system resources and drain power and thus battery life. Moreover, blocking advertisements can make the network experience more enjoyable for users of end-user devices using the network. Further, a large portion of network traffic can be the result of advertisements. As such, reducing the amount of advertisements sent through a network would provide better bandwidth utilization for the network and/or owner of the network.

End users may install ad blocking technology on their devices. However, ad-blocking technology may still consume resources on the end-user device. Further, some devices may block ad-blocking technology. For example, a web browser may attempt to bypass the ad-blocking technology, an operating system may attempt to block or restrict installation/functionality of the ad-blocking technology, etc. Further, companies have embraced employees brining their own devices to work. Loading ad-blocking technology to client devices owned by the company will not stop network bandwidth consumption initiated by devices not owned by the company.

Accordingly, various approaches described herein relate to stopping or substituting advertisements at the network level instead of at the client level. The network itself can stop advertisements in an efficient manner, without need for an end-user to install any software. In one example, in an enterprise location or campus network, networks can be controlled by an administrator. The approaches described herein can facilitate an administrator's ability to reduce network bandwidth for downloading advertisements, enable focusing of advertisements to enterprise goals, monetizing the environment's network by replacing with paid content, etc.

Figure 1:
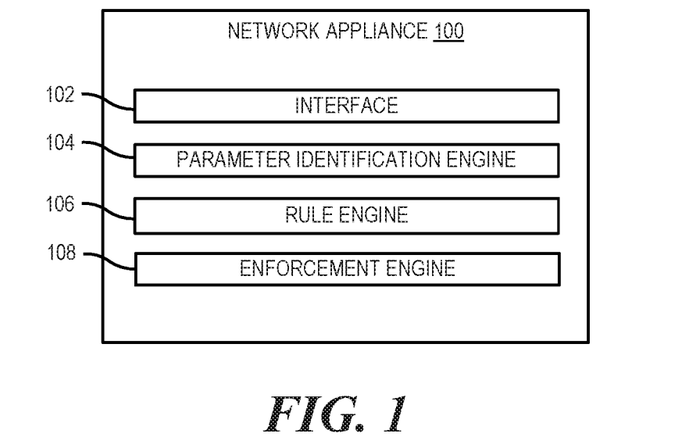
FIG. 1 is a block diagram of a network appliance capable of determining whether an advertisement indicator is present in a network packet, according to an example.

FIG. 1 is a block diagram of a network appliance capable of determining whether an advertisement indicator is present in a network packet, according to an example. The network appliance 100 can include components that can be utilized to determine whether an advertisement indicator is present in a network packet. In one example, the network appliance 100 can include an interface 102, a parameter identification engine 104, a rule engine 106, and an enforcement engine 108. In other examples, such as in FIG. 3, the network appliance 100 can further include a network infrastructure device management engine 110, a processor 130, and/or memory 132. The network appliance 100 can be, for example, a server, a Software Defined Networking (SDN) controller, or other computing device capable of performing the features described herein.

Figure 2:
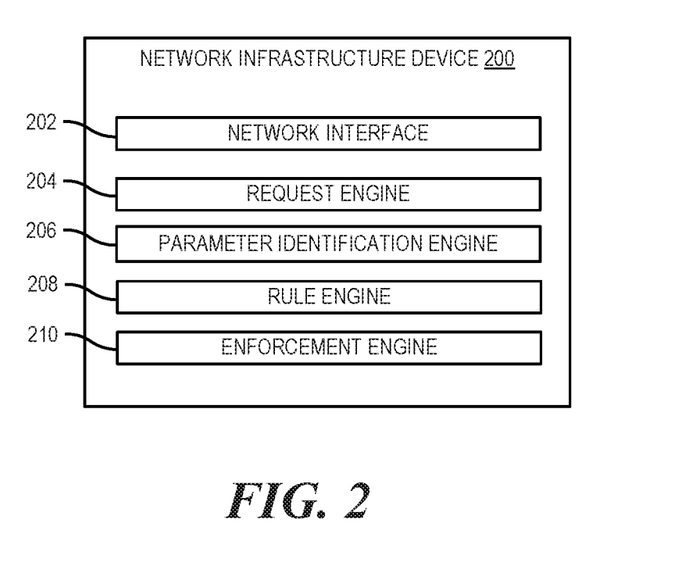
FIG. 2 is a block diagram of a network infrastructure device capable of performing an action based on an advertisement indicator, according to an example.

FIG. 2 is a block diagram of a network infrastructure device capable of performing an action based on an advertisement indicator, according to an example. In some examples, network infrastructure devices can be used to forward network packets to the network appliance 100 if the network packets meet particular criteria. In one example, the network infrastructure device 200 can include a network interface 202, a request engine 204, a parameter identification engine 206, a rule engine 208, and an enforcement engine 210. In another example, the network infrastructure device 200 can further include a processor 230 and/or memory 232. The network infrastructure device 200 can further include a processor 230 and/or memory 232. The network infrastructure devices 200 can include, for example, switches, routers, wireless access points, etc. capable of providing the functionality described herein.

Figure 3:
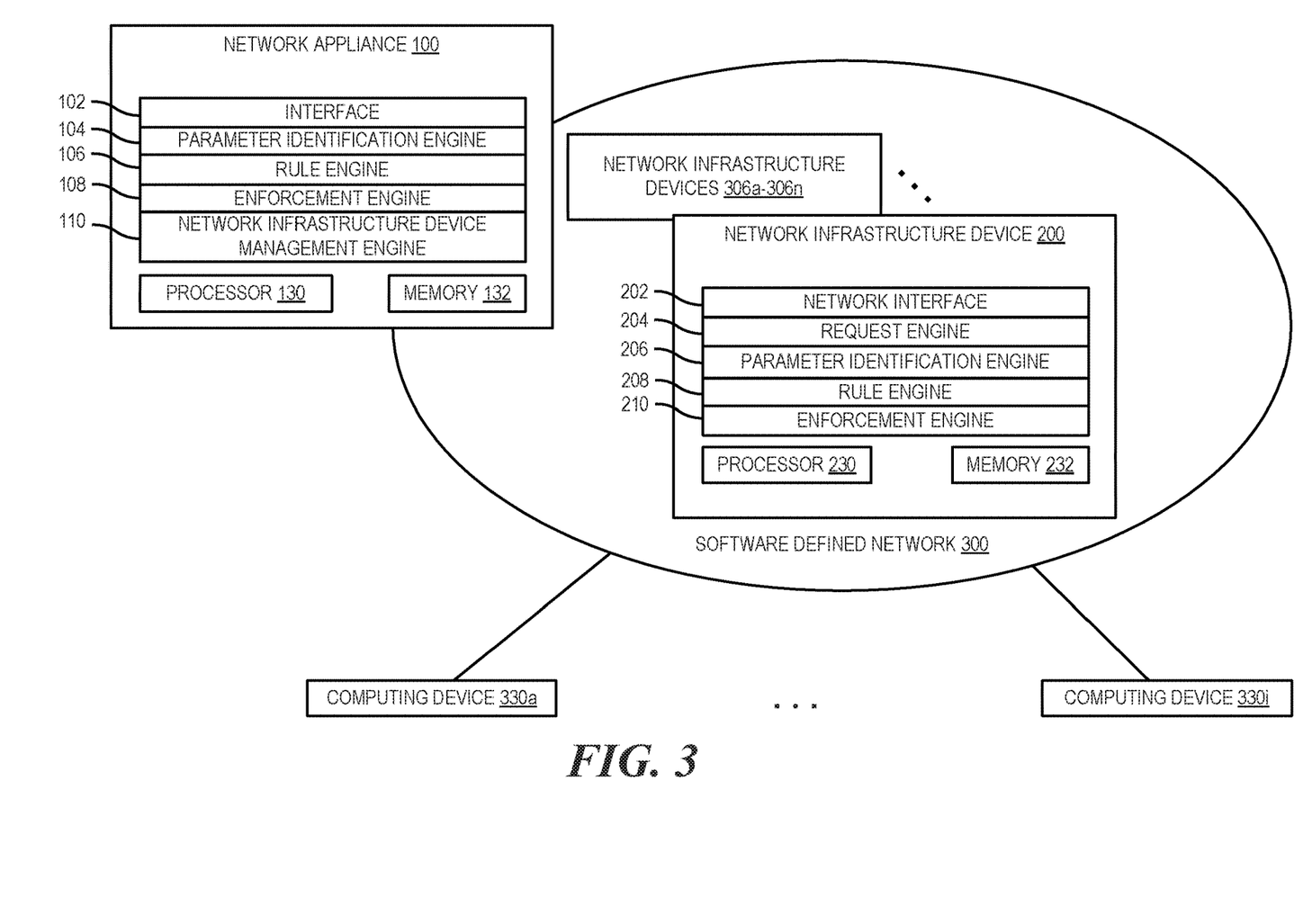
FIG. 3 is a block diagram of a network system including devices capable of performing actions on network packets based on an indication of advertisements, according to an example.

FIG. 3 is a block diagram of a network system including devices capable of performing actions on network packets based on an indication of advertisements, according to an example. The networking system can include a software defined network (SDN) 300. The SDN 300 can include a number of network infrastructure devices 306a-306n such as network infrastructure device 200. The SDN 300 can be used to provide communications capabilities between computing devices 330a-330i. Though the software defined network 300 is shown between computing devices 330 in this example, communications may also travel through other network infrastructure devices that are both part of the software defined network 300 or part of other networks (e.g., via the Internet). The computing devices 330a-330i can be implemented via a processing element, memory, and/or other components.

When a computing device 330a communicates with another computing device (e.g., computing device 330i), the communication can travel through the SDN 300. As such, traffic can pass through one or more network infrastructure devices 306, 200 in the SDN 300. In some examples, network infrastructure devices 306, 200, such as network infrastructure device 200, can be configured to inspect traffic and send packets that may be indicative of advertisements in a flow of traffic to the network appliance 100 for additional checking. As further described below, the network infrastructure device 200 may also perform some or all of the additional checking on the network infrastructure device 200.

When a packet goes through network infrastructure device 200, a network interface 202 can receive the packet. In some examples, the network interface 202 switches traffic between inputs and outputs using standard processing (e.g., a standard switch process based on source and destination addresses of the packets). Traffic includes packetized data ("packets") formatted using multiple layers of protocol, e.g., the Transmission Control Protocol (TCP) Internet Protocol (IP) ("TCP/IP") model, Open Systems Interconnection (OSI) model, or the like. A packet generally includes a header and a payload. The header implements a layer of protocol. The payload includes data, which may be related to packet(s) at another layer of protocol.

In an example, the network interface 202 performs switching of the packets at a network access layer. The network access layer provides links between hosts over which packets are transmitted. The network access layer is sometimes referred to as layer 2, referring to layer 2 of the OSI model. The prevailing network access layer today includes the Ethernet family of protocols, although the network interface 202 can switch packets using other types of network access protocols. While the network interface 202 can switch traffic at the network access layer, the network interface 202 may also process packets at layers above the network access layer to implement various other functions (e.g., quality of service (QoS), such as at a network layer (e.g., IP or other OSI layer 3 protocol) and/or transport layer (e.g., TCP, User Datagram Protocol (UDP), or other OSI layer 4 protocol).

The network infrastructure device 200 can be configured to inspect packets to determine whether advertisement analysis should be performed by the network infrastructure device 200 and/or network appliance 100. In one example, the request engine 204 can be configured to look at network packets to identify network packets that represent requests that may provide useful information as to whether an advertisement is included in the packet and/or a flow of traffic associated with the request. One example of such a request is a domain name system (DNS) request. Other examples include Hypertext Transfer Protocol (HTTP) requests such as HTTP GET and CONNECT requests. As used herein, a GET request is a request for data from a specified resource. Further, as used herein, a CONNECT request is an approach to establish a tunnel to a remote end-point.

A network infrastructure device management engine 110 can be used to configure the network infrastructure device 200 to look for particular criteria in packets for further analysis. The network infrastructure device management engine 110 can communicate with the network infrastructure device 200 using various communications means, such as the OpenFlow communications protocol or other communication protocol that gives access to a forwarding plane of a network infrastructure device 306, 200. A rule insertion capability of the protocol can be used to configure implementation of matching functionality in the network infrastructure device 200.

In the example of DNS requests, the request engine 204 can inspect the packets for particular criteria that are associated with the pre-identified DNS requests. For example, the request engine 204 can be configured to match against particular header fields. In one example, if the header field eth_type=IPv4, ip_proto=UDP, and udp_dst=53, the packet can be determined to be relevant to advertisement analysis. As such, the packet (or copy) can be forwarded, through the network interface 202, to the network appliance 100 for further analysis. The analysis may include whether the domain name in the packet is on a list that is recognized as being related to advertisements.

In the example of HTTP requests, a single website may contain references to other websites which serve valid content or advertisements. However, the distinction between valid content and advertisement may be apparent based upon a full or partial URL/URI of the requested resource, rather than merely the domain name. Thus, in one example, the request engine 204 can inspect the packets for particular criteria related to pre-identified requests that provide sufficient information about the requested resource. For example, the request engine 204 may match against header fields that indicate eth_type=IPv4, ip_proto=TCP, tcp_dst=(80 or 8080), and http_request_method=(GET or CONNECT), which can indicate that the packet is relevant to advertisements. As with the DNS request case, the network interface 202 can forward the identified packets (or copies) to the network appliance 100. Moreover, in some examples, the network appliance 100 may be capable of making the request on behalf of the requestor and fetching the resource (e.g., advertisement) to inspect the resource.

The interface 102 of the network appliance 100 can receive communications from the network interface 202. In one example, the network appliance 100 can be a SDN controller and the SDN can also be controlled using the network appliance. Further, the network appliance 100 may use the interface 102 to communicate with the network infrastructure devices 306, 200. In some examples, the interface 102 may act on a control plane while data communications travel through a data plane. In other examples, the network interface 202 may send communications to the network appliance 100 using another protocol and the data plane. The network appliance 100 can receive at interface 102, the network packet that was identified by the network infrastructure device 200 as matching the criteria associated with the pre-identified request (e.g., DNS request, GET request, CONNECT request, etc.).

The parameter identification engine 104 can be used to identify a parameter in the network packet that can be used to determine whether there is an indication of association of the network packet and an advertisement. In one example, the packet is a DNS request. In this example, the parameter is a domain name. In other examples, the packet can be either a GET request or a CONNECT request. In these examples, the parameter is a URI or URL. There parameters can be found in headers. Moreover, the parameter identification engine 104 can base the parameter identification on what type of network packet is received. In some examples, the parameter identification engine 104 can compare the same header fields used by the network infrastructure device 200 to determine the type of packet. In other examples, the network infrastructure device 200 may add a communication (e.g., encapsulate the packet and send additional information using another protocol) to the network packet.

Rule engine 106 can be used to determine whether the parameter indicates that an advertisement indicator is present in a flow associated with the network packet based on a rule. The rule can be, for example, a comparison of the parameter with a list, pattern matching the parameter against one or more patterns, etc.

In one example, the network packet is a DNS request. In this example, the parameter includes a domain name. The domain name can be compared to a list that includes domain names that are known or assumed to serve advertisements. If the domain name is on the list, an advertisement indicator is present indicating that an advertisement is likely in the flow.

In another example, the network packet is an HTTP request such as a GET request or CONNECT request. In this example, the parameter can be a URI. The URI may be absolute (e.g., a full URL including a host value (e.g., [hostvalue]/folder/advertisement.html)) or may be relative (e.g., /folder/advertisement.html). The URI can be compared to a URI pattern indicative of advertisements. Patterns that can be matched can be in the form of regular expressions, lists, Bloom tables, hashing and comparison to a list, etc. in some examples, machine learning can be used on lists of URIs with structures indicative of advertisements to determine the criteria used in the pattern matching. As such, an advertisement indicator can be determined to be present if the URI is matched with a URI pattern indicative of advertisements. Other examples of structures indicative of advertisements can include [*]lads, /banners, /clickonme, etc. In some examples, URI structures and/or domain names can come from services or available lists.

The enforcement engine 108 can perform actions based on whether an advertisement indicator is present in the network packet. In one example, the action can include a response to a requestor of the request (e.g., computing device 330a). In another example, where the network packet is a DNS request, a response to a domain name found to be associated with advertisements can be a response indicating that the domain name was not found. In other examples, the response can indicate an Internet Protocol (IP) address for a substitute advertisement server, for example, a server controlled by an administrator of the SDN 300. Further, in some examples, the response can indicate that the response is from a DNS server. The network appliance 100 may be provided the capability of assuming the identity of the DNS server (e.g., by being provided identification data of the DNS server) and/or advertisement server. With the above approaches, the network appliance 100 can respond to a request that includes an indicator that advertisements are present by denying the request and pretending that the host/resource is not available or responding with a substitute.

In some examples, the server can be an approved advertisement server. The approved advertisement server can be in the SDN 300 or outside of the SDN 300. Further, the approved advertisement server may include advertisements located in structures that mimic advertisements on known advertisement servers. To implement this, known advertisement servers can be crawled and replacement content for the ads be used on the approved advertisement server. In some examples, the replacement ad may be blank or smaller in size compared to the original advertisement. In other examples, the replacement ad may be based on an advertisement purchased by another or associated with a company owning the SDN 300. For example, in the case of a campus network or establishment such as a hotel of coffee shop, the advertisements may be sold to area shops or may be used to promote the establishment (e.g., provide sales promotions or advertise additional features).

In other examples, if an advertisement indicator indicating that an advertisement is present in the flow is not present, the request can be re-inserted to the network and destined for the DNS server. As noted, this can be implemented using Open Flow or other control protocol. To avoid re-inspecting the same DNS request multiple times (e.g., as it crosses multiple controlled network infrastructure devices 306, 200), various approaches can be used. In one example, the matching criteria for the network infrastructure devices 200 can include the ingress port and push a separate rule for each edge port on the network. As such, non-edge network infrastructure devices need not implement the functionality. In another example, when the response to the DNS request is re-inserted (e.g., in the case of a non-match), it is not re-inserted into the network infrastructure device 200 that forwarded the packet to the network appliance 100. Rather, the DNS request would be re-inserted into the network infrastructure device 200, 306 that is nearest to the known location of the DNS server.

In one example, the request is an HTTP request. In this example, the action can include substituting web content for a resource associated with the URI. This can occur, in one example, by responding with the content expected (e.g., the network appliance 100 may include default blank resources of each type (e.g., image, video, flash, etc.) and respond with blank content. This can also be implemented by providing a reference to the content. For example, if the requested URI matched a pattern, then a response would be issued by the network appliance 100 and inserted into the network as if it came from the intended HTTP recipient. The response can include, for example, a HTTP 302 response, which is an approach to perform URL redirection. The 302 response can invite the computing device 330a to perform another request to the URL input in the 302 response. In another example, the action can include denying the HTTP request and inserting an HTTP 404 "not found" response.

In one example, the network appliance 100 can fetch the resource requested from the host. The network appliance 100 can then inspect the fetched resource. In one example, the resource can be inspected to determine whether it includes an advertisement based on content. In another example, the resource can be inspected to determine a size of the resource (e.g., an image, video, other rich content, etc.). Using the size information, the network appliance 100 can determine a substitute for the advertisement (e.g., a same or similar viewable sized substitute advertisement, blank resource, etc.).

In some examples, to avoid re-inspection, if the requested URI did not match, the request could be re-inserted to the SDN 300 and destined for the HTTP recipient. This, too, may be accomplished via OpenFlow or another similar control protocol. Moreover, a replacement URL and/or domain may be included on a whitelist of allowed requests.

The network infrastructure device management engine 110 can be used to push rules to network infrastructure devices 200, 306. The rules can include instructions for the network infrastructure device to check for whitelisted and/or blacklisted criteria. Matches for blacklisted criteria can lead to an advertisement indicator that an unwanted advertisement is present and can have corresponding pre-determined responses stored on the network infrastructure device 200. Matches for whitelisted criteria can similarly lead to an advertisement indicator that an approved advertisement may be present or an indicator that an unwanted advertisement is not present. This whitelisted advertisement indicator can lead to processing the packet normally without sending to the network appliance 100 or intercepting the packet and sending a response in its place.

The network infrastructure device management engine 110 can determine these rules from input such as new web advertisement data and advertisements commonly used on the SDN 300. In one example, when a domain name or particular URI is used the network appliance 100 can track the usage. This way, more common advertisement indicators can be made into rules for network infrastructure devices 200, 306. Moreover, the lists, rules, and criteria for both the network appliance and the network infrastructure devices 200, 306 can be updated. In one example, when usage hits a threshold, the network infrastructure device rule can be updated and sent to the network infrastructure devices 200, 306, which can implement the rules.

In some examples, the approaches for DNS requests and HTTP requests can be used in conjunction. At a first stage, DNS requests are processed. This way content from domain names known to serve advertisements can be stopped or substituted. In some examples, the list of domain names can include domain names that are well known ad servers (where all or most content can be assumed to be advertisements). Other websites that serve both non-advertisement content and advertisement content can be addressed by the second stage. The second stage looks at the HTTP request to determine whether the structure of a URI indicates an advertisement. With this approach, the number of HTTP requests to check is reduced because requests related to DNS requests that were responded to with "not found" are not formed.

In one example, the network infrastructure device 200 can receive, at network interface 202, a network packet. The request engine 204 can determine that the packet is associated with one of the pre-determined request types described. The parameter identification engine 206 of the network infrastructure device 200 can identify a parameter from the network packet based on the association with the pre-determined request type (e.g., a DNS request may yield a domain name parameter, a GET or CONNECT request may yield a URI).

The rule engine 208 can implement rules received from the network appliance 100 or other device. Rules can be used to check whether the parameter matches criteria that leads to a particular advertisement indicator. As used herein, an "advertisement indicator" is a gauge of whether an advertisement is likely present based on criteria. Advertisement indicators can be linked to particular actions to take. The enforcement engine 210 can perform that action.

In one example, a rule can provide criteria that, when matched by the parameter, yields an advertisement indicator that is blacklisted (e.g., a domain name in a DNS request is known to be associated with serving advertisements). A denial or substitute response action can be taken.

In another example, a rule can provide criteria that, when matched by the parameter, yields an advertisement indicator that is whitelisted (e.g., an approved domain name, a URI structure that indicates an approved advertisement is present, etc.). The action for such an advertisement indicator could be that request can be processed normally. In some examples, substitute domain names/URIs may include fingerprints (e.g., "approved server host name" or "/approvedadvertisements") that can be used to indicate that advertisements or substitutions are approved.

In other examples, a rule can indicate that if other criteria are not matched, further processing is to be taken. As such, the enforcement engine 210 can take an action to forward the network packet to the network appliance 100 (e.g., a SDN controller). This approach can be used because the network appliance 100 may have more resources and processing capability than a network infrastructure device 200, thus matching abilities may be limited.

The engines 104, 106, 108, 110, 204, 206, 208, 210 include hardware and/or combinations of hardware and programming to perform functions provided herein. Moreover, the modules (not shown) can include programing functions and/or combinations of programming functions to be executed by hardware as provided herein. When discussing the engines and modules, it is noted that functionality attributed to an engine can also be attributed to the corresponding module and vice versa. Moreover, functionality attributed to a particular module and/or engine may also be implemented using another module and/or engine.

A processor 130, 230, such as a central processing unit (CPU) or a microprocessor suitable for retrieval and execution of instructions and/or electronic circuits can be configured to perform the functionality of some or any of the engines 104, 106, 108, 110, 204, 206, 208, 210 described herein. In certain scenarios, instructions and/or other information, such as criteria and/or enforcement actions, can be included in memory 132, 232 or other memory. Moreover, in certain examples, some components can be utilized to implement functionality of other components described herein. Input/output devices such as communication devices like network communication devices or wireless devices can also be considered devices capable of using the input/output interfaces.

The SDN 300 can use wired communications, wireless communications, or combinations thereof. Further, the SDN 300 may be part of another communication network that can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Various communications structures and infrastructure can be utilized to implement the communication network(s).

By way of example, the computing devices 330a-330i communicate with each other and other components with access to the communication network via a communication protocol or multiple protocols. A protocol can be a set of rules that defines how nodes of the communication network interact with other nodes. Further, communications between network nodes can be implemented by exchanging discrete packets of data or sending messages. Packets can include header information associated with a protocol (e.g., information on the location of the network node(s) to contact) as well as payload information.

In some examples, some or all of the engines 104, 106, 108, 110, 204, 206, 208, 210 can be implemented using various technologies, for example, a programmable switch ASIC and/or other resources (e.g., TCAM, hashes, counters, etc.). In an example, the implementation to match criteria can be based on at least one Bloom filter. A Bloom filter can be used to test whether an element (e.g., a character, string of characters, a byte pattern from packet(s)) is a member of a set (e.g., interesting byte patterns indicative of advertisements). In another example, the criteria can be based on a regular expression filter. A regular expression filter searches for byte patterns in the packets using regular expressions.

Though GET and CONNECT requests are called out in the description, inspection can also be performed on other packets, for example, each HTTPS packet. When the HTTPS connection is set up, a Secure Sockets Layer (SSL) proxy technique can be used to set up the network appliance 100 as a man-in-the-middle for communications of the flow. The network appliance 100 may further include some of the functionality of the network infrastructure device 200 in this example.

Figure 4:
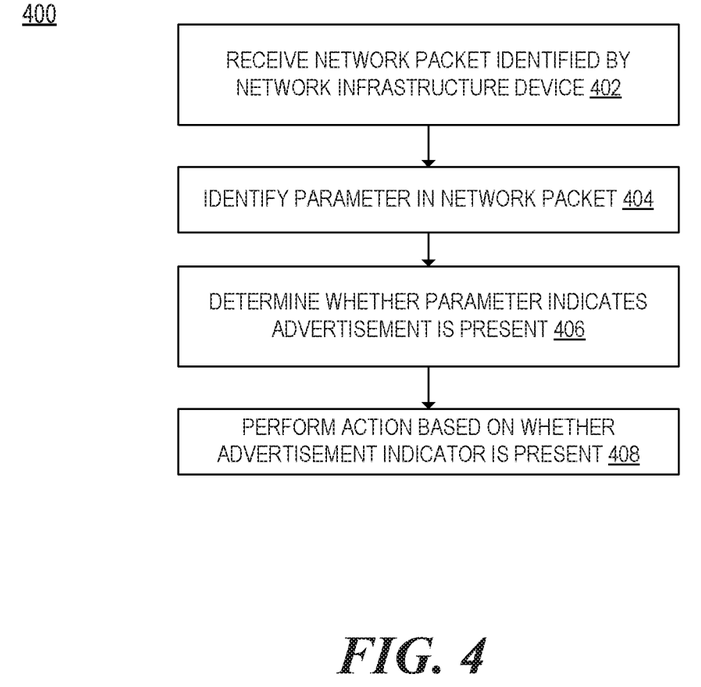
FIG. 4 is a flowchart of a method for performing an action based on an advertisement indicator, according to an example.
Figure 5:
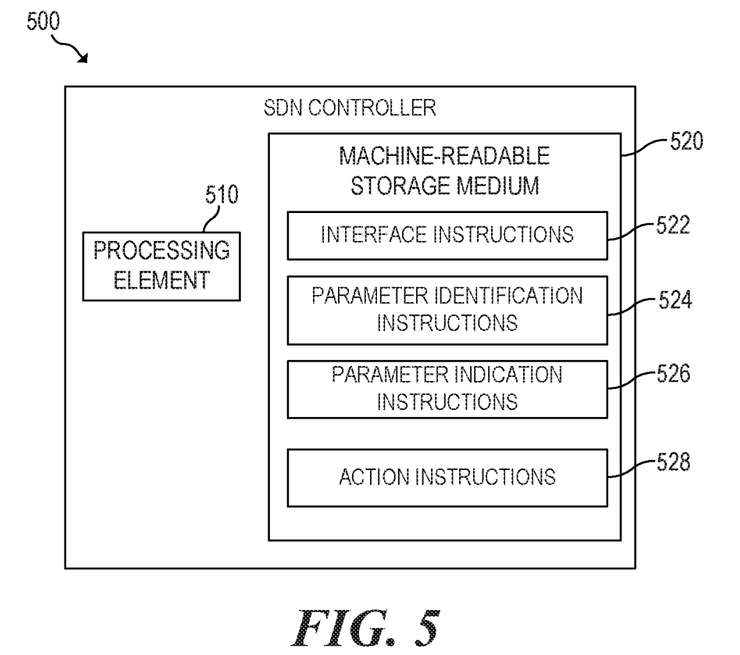
FIG. 5 is a block diagram of a device capable of performing an action based on an advertisement indicator, according to an example.

FIG. 4 is a flowchart of a method for performing an action based on an advertisement indicator, according to an example. FIG. 5 is a block diagram of a device capable of performing an action based on an advertisement indicator, according to an example. The SDN controller 500 includes, for example, a processing element 510, and a machine-readable storage medium 520 including instructions 522, 524, 526, 528 for performing an action based on an advertisement indicator. SDN controller 500 may be implemented using, for example, a server, a workstation, or any other computing device capable of performing the tasks described herein.

Processing element 510 may include, one or multiple central processing unit (CPU), one or multiple semiconductor-based microprocessor, one or multiple graphics processing unit (GPU), other hardware devices suitable for retrieval and execution of instructions stored in machine-readable storage medium 520, or combinations thereof. The processing element 510 can be a physical device. Moreover, in one example, the processing element 510 may include multiple cores on a chip, include multiple cores across multiple chips, or combinations thereof. Processing element 510 may fetch, decode, and execute instructions 522, 524, 526, 528 to implement identification of advertisement indicators and actions to perform in response. As an alternative or in addition to retrieving and executing instructions, processing element 510 may include at least one integrated circuit (IC), other control logic, other electronic circuits, or combinations thereof that include a number of electronic components for performing the functionality of instructions 522, 524, 526, 528. For example, the processing element 510 can include a programmable packet processor, which may also include TCAMs, hashes, counters, etc.

Machine-readable storage medium 520 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 520 may be encoded with a series of executable instructions for performing an action based on an advertisement indicator.

At 402, the interface instructions 522 can be executed by processing element 510 to receive a network packet identified by a network infrastructure device as matching criteria associated with a pre-identified request such as a DNS request, a GET request, or a CONNECT request. At 404, parameter identification instructions 524 can be executed to identify a parameter in the network packet. As noted above, the identification can be based on determining the type of network packet and looking for particular content (e.g., a domain name for a DNS request, a URI for a HTTP GET or CONNECT request, etc.).

At 406, parameter indication instructions 526 can be executed by the processing element 510 to determine whether an advertisement indicator is present in the network packet. More than one advertisement indicator can be searched for. One or more of the advertisement indicators can correspond to actions to be taken.

At 408, action instructions 528 can be executed by the processing element 510 to perform an action based on whether a particular advertisement indicator (e.g., based on a matched domain name, matched URI, etc.) is present in the network packet. In one example, the action can include providing a response to a source device of the network packet as described above.

In another example, the SDN controller 500 may perform an action to determine a new rule to implement at the network infrastructure device(s) controlled by the SDN controller 500. As noted above, a new rule can be based on analytics of advertisement content on the network and/or based on updated lists of advertisement servers and/or URI structures. Action instructions 528 can be implemented to send the network infrastructure device(s) the rule(s). As noted above, the rule(s) can include another action to perform locally on the network infrastructure device based on the advertisement indicator. For example, if a sufficient number of DNS requests come for a newly seen ADSERVER1, a rule for a default action to take can be updated on the network infrastructure devices.

What is claimed is:

1. A network appliance facilitating a specialized networking service, the network appliance comprising:
    processing circuitry;
    an interface to receive a packet from a network device based on packet matching criteria associated with a pre-determined packet request type at an ingress port of the packet at the network device;
    a parameter identification engine to identify a parameter associated with the packet request type in the packet, wherein the parameter indicates an association between the packet and an advertisement;
    a rule engine to determine whether the parameter corresponds to an advertisement indicator for a data flow of the packet based on the ingress port and a rule specific to the ingress port, wherein the advertisement indicator indicates a likelihood of presence of the advertisement in the data flow; and
    an enforcement engine to perform an action to the data flow based on presence of the advertisement indicator in the packet and a size of a piece of content associated with the advertisement.

2. The network appliance of claim 1, wherein the packet is a domain name system (DNS) request and the parameter includes a domain name, wherein the rule compares the domain name to a list that includes domain names known to serve advertisements, and wherein the advertisement indicator is presence of the domain name on the list.

3. The network appliance of claim 2, wherein the action includes a response to a requestor of the DNS request, and wherein the response indicates that the response is from a DNS server.

4. The network appliance of claim 1, wherein the parameter includes a Uniform Resource Identifier (URI) in the packet, and wherein the advertisement indicator is the URI matching a pattern indicative of advertisements.

5. The network appliance of claim 4, wherein the request is a Hypertext Transfer Protocol (HTTP) GET request or an HTTP CONNECT request.

6. The network appliance of claim 4, wherein the action includes substituting web content for a resource associated with the URI.

7. The network appliance of claim 1, further comprising:
a network device manager to determine a network device rule based on the rule,
wherein the action includes sending the network device rule to the network device, and
wherein the network device rule specifies a second action to be performed by the network device based on the advertisement indicator.

8. The network appliance of claim 1, wherein the action includes denying a request in the packet and responding to a requestor of the packet with an indication that a resource for the request is unavailable.

9. A non-transitory machine-readable storage medium storing instructions that, if executed by a physical processing element of a software defined networking (SDN) controller, cause the SDN controller to:
receive a packet from a network device based on packet matching criteria associated with a pre-determined packet request type at an ingress port of the packet at the network device;
identify a parameter associated with the packet request type in the packet, wherein the parameter indicates an association between the packet and an advertisement;
determine whether the parameter corresponds to an advertisement indicator for a data flow of the packet based on the ingress port and a rule specific to the ingress port, wherein the advertisement indicator indicates a likelihood of presence of the advertisement in the data flow; and
perform an action to the data flow based on presence of the advertisement indicator in the packet and a size of a piece of content associated with the advertisement.

10. The non-transitory machine-readable storage medium of claim 9, further comprising instructions that, if executed by the physical processing element, cause the SDN controller to:
determine a network device rule based on the rule, wherein the action further includes sending the network device rule to the network device, and wherein the network device rule specifies a second action to be performed by the network device based on the advertisement indicator.

11. The non-transitory machine-readable storage medium of claim 9,
wherein the packet is a domain name system (DNS) request and the parameter includes a domain name, wherein the rule compares the domain name to a list that includes domain names known to serve advertisements, and wherein the advertisement indicator is presence of the domain name on the list.

12. The non-transitory machine-readable storage medium of claim 9, further comprising instructions that, if executed by the physical processing element, cause the SDN controller to:
identify a Uniform Resource Identifier (URI) in the parameter in the packet;
wherein the advertisement indicator is the URI matching a pattern indicative of advertisements.

13. The non-transitory machine-readable storage medium of claim 11, wherein the action includes a response to a requestor of the DNS request, and wherein the response indicates that the response is from a DNS server.

14. The non-transitory machine-readable storage medium of claim 9, wherein the action includes denying a request in the packet and responding to a requestor of the packet with an indication that a resource for the request is unavailable.

15. A network device, comprising:
processing circuitry;
a network interface to receive a packet from a remote device;
a request logic block to determine that the packet is associated with a pre-determined packet request type and received at an ingress port of the network device;
a parameter identification manager to identify a parameter associated with the packet request type in the packet, wherein the parameter indicates an association between the packet and an advertisement;
a rule logic block to determine whether the parameter corresponds to an advertisement indicator for a data flow of the packet based on the ingress port and a rule specific to the ingress port, wherein the advertisement indicator indicates a likelihood of presence of the advertisement in the data flow; and
an enforcement logic block to perform an action to the data flow based on presence of the advertisement indicator in the packet and a size of a piece of content associated with the advertisement.

16. The network device of claim 15, wherein the packet is a domain name system (DNS) request and the parameter includes a domain name,
wherein the rule compares the domain name to a list that includes domain names known to serve advertisements, wherein the advertisement indicator is presence of the domain name on the list.

17. The network device of claim 15, wherein the parameter includes a Uniform Resource Identifier (URI), in the packet, and wherein the advertisement indicator is the URI matching a pattern indicative of advertisements.

18. The network device of claim 16, wherein the action includes a response to a requestor of the DNS request, and wherein the response indicates that the response is from a DNS server.

19. The network device of claim 15, wherein the action includes denying a request in the packet and responding to a requestor of the packet with an indication that a resource for the request is unavailable.

20. The network appliance of claim 15, further comprising an interface to receive a network device rule that specifies a second action to be performed based on the advertisement indicator.

* * * * *